July 28, 1942.  C. C. FARMER  2,290,953
FLUID PRESSURE BRAKE CONTROL DEVICE
Filed Nov. 22, 1940
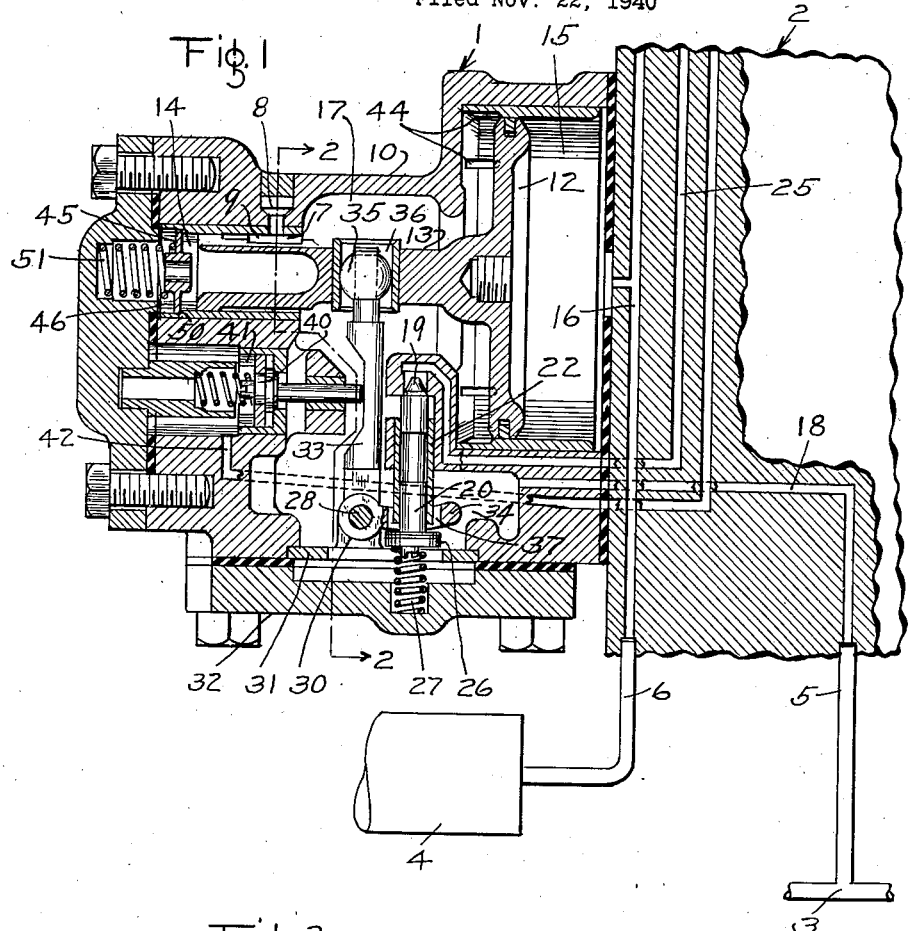
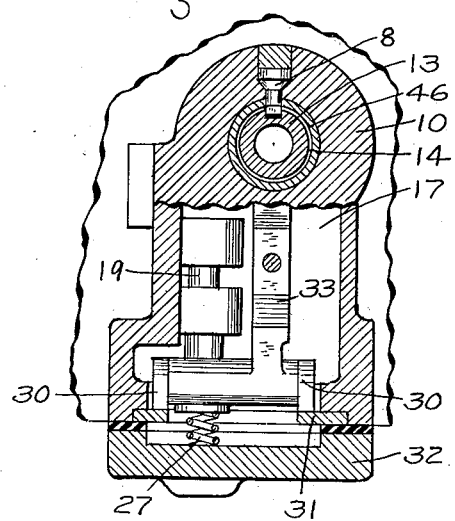
INVENTOR
CLYDE C. FARMER
BY 
ATTORNEY Patented July 28, 1942

2,290,953

UNITED STATES PATENT OFFICE 2,290,953

FLUID PRESSURE BRAKE CONTROL DEVICE

Clyde C. Farmer, Pittsburgh, Pa., assignor to The Westinghouse Air Brake Company, Wilmerding, Pa., a corporation of Pennsylvania Application November 22, 1940, Serial No. 366,636

8 Claims. (Cl. 303—55)

This invention relates to fluid pressure brakes of the type in which the brakes are applied by reducing brake pipe pressure and released by increasing brake pipe pressure, and more particularly to a control device for controlling the release of air from the brake pipe to effect a service application of the brakes.

Brake equipments of the above type usually employ an equalizing discharge valve mechanism comprising a piston subject to the opposing pressures of fluid in an equalizing reservoir and a brake pipe. This piston is operative upon a reduction in equalizing reservoir pressure to effect operation of a brake pipe discharge valve to vent fluid under pressure from the brake pipe to effect an application of the brakes.

In Patent 1,975,264, issued to Clyde C. Farmer, there is disclosed an improved equalizing discharge valve mechanism which is employed in the well known 8ET and other recent types of locomotive brake equipments and which is adapted to operate to control the venting of fluid under pressure from the brake pipe in accordance with the reduction in the equalizing reservoir pressure. This valve mechanism is also adapted to operate to supply fluid under pressure to the brake pipe at a rate equal to the rate of leakage from the brake pipe, to thus prevent any drop in brake pipe pressure due to leakage.

It has become common practice among railroad engineers to make two applications of the brakes in bringing a train to a stop at a desired location. This practice has become generally known as a two-application stop. In passenger train service where trains are traveling at relatively high speeds when approaching a station stop, a heavy brake application is made at some location before the station is reached. This heavy application is released as soon as the train speed is reduced to about twenty miles per hour. The train proceeds at this speed until the train approaches the desired stop, when a light application of the brakes is effected to bring the train to a stop at the desired location.

During the interval of time that the brakes are being released the equipment is of course being recharged with fluid under pressure, and it has been discovered in practice that during such recharging operation the equalizing reservoir and consequently the equalizing piston chamber in some instances may become overcharged, that is to say, charged to a pressure exceeding the pressure in the brake pipe. Since in existing equipments the equalizing reservoir and brake pipe pressure cannot at this time equalize with each other it will be apparent that when the reduction in equalizing reservoir pressure is made to effect the reduction in brake pipe pressure, and thereby the second application of the brakes, the overcharge in the equalizing reservoir must be entirely dissipated before the equalizing reservoir pressure can be reduced to permit the opposing brake pipe pressure to cause the equalizing valve device to operate to its brake pipe venting position. The engineer would have no knowledge of such an overcharge and therefore may not properly control the second application of the brakes so as to bring the train to a stop at the desired location. In other words, any such overcharge would render uncertain the stopping of the train at a particular designated location.

The principal object of the present invention is to provide an equalizing discharge valve mechanism of the above mentioned type with means adapted to automatically relieve any excess pressure built up on the equalizing reservoir side of the piston and to thereby eliminate the above mentioned difficulties.

In the accompanying drawing,

Fig. 1 is a diagrammatic sectional view of an equalizing discharge valve mechanism embodying my invention.

Fig. 2 is a fragmentary sectional view of the equalizing discharge valve mechanism taken on the line 2—2 of Fig. 1.

The portion of the fluid pressure brake equipment with which the invention has been illustrated may be of the same general type as that fully shown and described in the aforementioned patent and may comprise an equalizing discharge valve mechanism 1 secured in any suitable manner to a portion of a pipe bracket or brake valve pedestal 2, to which a brake pipe 3 and an equalizing reservoir 4 are connected, by means of pipes 5 and 6, respectively.

As shown in the drawing, the equalizing discharge valve mechanism may comprise a casing 10 in which there is operatively mounted a piston 12 having a stem 13 which is slidably guided in the casing within a bushed bore 14. A slot 7 is provided lengthwise along the outer portion of the stem 13, and a pin 8 carried by said casing is provided with a T-head bolt 9 extending into the slot 7 to prevent the piston stem 13 from turning.

At one side of the piston 12 there is a piston chamber 15 with which the equalizing reservoir 4 is in constant communication by way of pipe 6 and a passage 16. At the other side of the piston 12 there is a valve chamber 17 which is in constant open communication with brake pipe 3 by way of a pipe 5 and a passage 18. This chamber contains an exhaust valve 19 which is operative to control communication from the valve chamber 17 to an exhaust passage 25. The exhaust valve 19 is provided with a stem 20 which is slidably guided in a tubular bushing 22 carried by the casing. The valve stem 20 extends through the bushing and adjacent its outer end is provided with a collar 26. Interposed between and engaging the outer surface of this collar and the casing is a coil spring 27 which normally maintains the exhaust valve seated, as shown in Fig. 1 of the drawing.

Contained in the valve chamber 17 is a bell crank lever which is rockably mounted on a pin 28 mounted on inwardly extending lugs 30 of a support member 31 clamped between the casing and a cover plate 32, said lever comprising arms 33 and 34. The end portion 35 of the arm 33 is substantially spherical in form and is operatively engaged by the piston stem 13 within an opening 36 which preferably extends through the stem. The arm 34 is provided with an opening 37 through which the lower end of the bushing 22 and exhaust valve stem 20 extends, the portion of said arm on each side of the opening being adapted to operatively engage the inner face of the collar 26 to control the operation of exhaust valve 19. At a point intermediate its spherical end 35 and the pin 28 the arm 33 is adapted to operatively engage the end of the stem of a supply or maintaining valve 40 contained in a chamber 41. This chamber may be connected to any suitable source of fluid under pressure, such as a main reservoir (not shown), by means of a passage 42. The valve 40 is for the purpose of maintaining the pressure in chamber 17 against leakage, as fully described in the aforementioned patent.

It will be understood that due to the shape of end portion 35 of the arm 33, free vertical and rocking movement of the end 35 relative to the piston stem 13 is permitted, thus preventing any binding action from being set up between the arm and the piston stem upon the operation of the piston 12.

As so far described, the equalizing discharge valve mechanism is the same as the corresponding mechanism shown in the aforementioned patent. According to the invention, one or more feed grooves 44 are provided which are adapted, in one position of the piston 12, to establish communication around the piston between chambers 15 and 17.

In addition to the grooves 44 a yieldable stop member 45 is provided which is located adjacent the end of the stem 13 and which is slidably mounted in a bushed bore 46. This bore is in longitudinal alignment with and of slightly greater diameter than the bore 14, so as to provide a stop shoulder 50. The stop member 45 in its normal position is urged into engagement with the shoulder 50 by means of a spring 51 which is interposed between and operatively engages the casing and the stop member 45. With the piston 12 and attached stem 13 in their normal position as shown in the drawing, the shoulder 50 maintains the stop member 45 in spaced relation to the outer end of the piston stem 13. Under these conditions the discharge valve 19 and the maintaining valve 40 are seated by action of spring 27 and the maintaining valve spring, respectively. With the maintaining valve 40 thus seated the outer end of the valve stem contacts the arm 33 of the bell crank lever, so that movement of the piston in a direction toward the left hand will unseat the maintaining valve 40 before the outer end of the piston stem 13 engages the stop member 45.

It will here be noted that when equalizing reservoir pressure in chamber 15 exceeds the pressure in the brake pipe present at the opposite side of the piston 12, the piston is caused to move in a direction toward the left hand thus causing the arm 33 of the bell crank lever to unseat the maintaining valve 40 in its traverse to a position in which the outer end of the piston stem 13 engages the stop member 45. It will here be noted that the stop member 45 is so positioned that it will not interfere with the normal operation of the maintaining valve. However, should the pressure in chamber 15 exceed the value of the spring 51, as it would in the event that the equalizing reservoir is overcharged, the piston 12 will be caused to compress spring 51 and will then move to its extreme left hand position in which communication is established around the piston 12 from chamber 15 to chamber 17 by way of feed grooves 44. With the piston in this position fluid under pressure at the higher equalizing reservoir pressure in chamber 15 and connected equalizing reservoir 4 flows through said feed grooves to chamber 17 and the brake pipe until substantial equalization of the pressures is attained.

Aside from the exceptions above noted, the operation of the equalizing discharge valve mechanism is the same as that of the equalizing discharge valve mechanism disclosed in the aforementioned patent and it is, therefore not believed necessary to describe such operation herein except insofar as necessary to a clear understanding of the invention.

*Operation*

When the brake equipment is in the normal or running condition, in which the brakes are adapted to be released and the train charged with fluid under pressure, the equalizing piston chamber 15, equalizing reservoir 4 which is connected to said chamber through pipe 6 and passage 16, and the valve chamber 17 at the opposite side of equalizing piston 12, are all charged with fluid at the pressure carried in the brake pipe 3. Under these conditions the parts of the equalizing discharge valve mechanism are maintained in the position shown in Fig. 1 of the drawing.

In order to effect an application of the brakes, such for instance, as the first application of a two-application stop, the handle of the usual brake valve device (not shown) is turned to service position. In this position the supply of fluid under pressure to the equalizing piston chamber 15 and connected equalizing reservoir 4 is cut off and fluid under pressure is vented from said chamber and reservoir through passage 16 to the usual exhaust passage, in the usual manner.

When the pressure in piston chamber 15 becomes reduced sufficiently below the brake pipe pressure in chamber 17, equalizing piston 12 is moved outwardly and acts to turn the bell crank lever 33—34 in a clockwise direction, thereby forcing the discharge valve 19 from its seat against the opposing pressure of spring 27.

With the discharge valve 19 unseated, fluid under pressure is vented from the brake pipe 3 through pipe 5, passage 18, chamber 17, past the discharge valve 19 to passage 25 and from thence to the atmosphere.

In case the rate of reduction in brake pipe pressure in chamber 17 is faster than that of the equalizing reservoir pressure in chamber 15 at the opposite side of the piston 12, then said piston is moved toward the left hand. Movement of the piston 12 and stem 13 to this position causes the bell crank lever to rock in a counterclockwise direction. As the bell crank is thus moved lever arm 33 thereof acts to unseat the maintaining valve 40, which causes fluid under pressure to be supplied to chamber 17. This movement of the bell crank continues until the piston 12 is brought to a stop by the increase in the valve chamber pressure 17 to that of the pressure of fluid in piston chamber 15 and the equalizing reservoir 4. It is obvious that the spring pressed stop member 45 will not be engaged by the piston stem during the maintaining operation and therefore does not interfere with such operation.

Now as the equalizing reservoir pressure continues to reduce, the piston 12 will be moved outwardly by means of the maintaining valve spring acting through the medium of the bell crank lever until such time as the maintaining valve 40 is seated. Any further reduction in equalizing reservoir pressure will now cause the piston to act to operate the bell crank lever to again unseat the brake pipe discharge valve 19. When the reduction in equalizing reservoir pressure ceases the piston 12, and thereby the bell crank lever, will operate due to the reduction in the pressure of fluid in valve chamber 17, to effect the closing of the discharge valve 19. The piston will now come to rest without causing the maintaining valve 40 to be unseated.

It will now be evident that, in effecting an application of the brakes, the rate of reduction in brake pipe pressure is so controlled by the automatic operation of the equalizing discharge valve mechanism as not to exceed the usual service rate of reduction in the pressure of fluid in the equalizing reservoir 4 and equalizing piston chamber 15. Thus far the operation of the mechanism 1 is the same as described in more detail in the aforementioned patent.

When it is desired to initiate a release of the brakes, the rotary valve of the usual automatic brake valve device (not shown) is turned to full release position in which position fluid under pressure is supplied from the usual main reservoir (not shown) to the brake pipe 3 and connecting valve chamber 17 and also to the equalizing reservoir 4 and connected piston chamber 15, the course of the flow of fluid being substantially the same as described in connection with the initial charging of the equipment.

If, as the result of supplying fluid at main reservoir pressure to the equalizing reservoir 4 and brake pipe 3, the pressure of fluid in the piston chamber 15 on one side of piston 12 becomes greater than the pressure of fluid in the brake pipe and in chamber 17 at the opposite side of the piston, piston 12 will be moved in a direction towards the left hand, until the end of the piston stem 15 engages the stop member 45. The piston in this position is yieldably resisted by means of the spring 51 acting through the medium of the stop member 45. The piston in its traverse to this position unseats the maintaining valve 40 but this is incidental since the maintaining passage 42 is closed by the brake valve device in release position. Should the pressure differential on the piston be sufficient to overcome the pressure of spring 51, the piston will be moved further in a direction towards the left hand to an extreme inner position. With the piston in this latter position the feed grooves 44 establish communication between the piston chamber 15 and valve chamber 17, so that fluid under pressure at the highest pressure in chamber 15 and connected equalizing reservoir 4 flows through said feed grooves to chamber 17 and connected brake pipe 3.

The flow of fluid under pressure from the equalizing reservoir 4 and connected piston chamber 15, through the feed grooves 44, continues until the pressure of fluid on opposite sides of piston 12 have substantially equalized with each other. When such substantial equalization occurs, the spring 51 through the medium of the stop member 45 and piston stem 13 moves the piston 12 in a direction toward the right hand to a position in which further communication between the chambers 15 and 17 through the feed grooves 44 is cut off.

Thus, when it is desired to effect the second application of a two-application stop, even though the usual brake valve device (not shown) may be moved immediately from release position to service position (as would be the case when the train is descending a long grade and the brake valve device is momentarily operated to release position for the recharge or the partial recharge of the brake equipment and then immediately returned to a service application position) the pressures in the equalizing reservoir and in the brake pipe are substantially equalized, so that the usual reduction in the pressure of fluid in the equalizing reservoir and connected chamber 15 will result from the usual manipulation of the brake valve device.

From the foregoing it will now be apparent that this improved equalizing discharge valve mechanism provides a simple means whereby any excess of pressure occurring in the equalizing reservoir and connected piston chamber 15 is automatically released, thus effectively eliminating the present difficulties in gauging the degree of braking required to bring the train to a stop at a designated place, imposed by overcharging of the equalizing reservoir.

While one illustrative embodiment of the invention has been described in detail, it is not my intention to limit its scope to this embodiment or otherwise than by the terms of the appended claims.

Having now described my invention, what I claim as new and desire to secure by Letters Patent, is:

1. An equalizing valve mechanism for a fluid pressure brake equipment having a brake pipe and an equalizing reservoir normally charged with fluid under pressure, said mechanism comprising a piston subject to the opposing pressures of fluid in the brake pipe and that in the equalizing reservoir and having an operating stem, said piston being operative to one position upon a reduction in equalizing reservoir pressure to operate a valve for venting fluid from the brake pipe and operative to another position upon a reduction in brake pipe pressure below equalizing reservoir pressure to operate another valve to supply fluid under pressure to the brake pipe, a communication adapted to be established upon movement of said piston to a third position for effecting equalization of the pressures on opposite sides of the piston, and means located adjacent to and normally spaced away from the free end of said stem for engaging said stem to resist movement of said piston to said third position, said means being so positioned as to have no effect upon the piston in its normal operation in venting fluid under pressure from or supplying fluid under pressure to the brake pipe.

2. An equalizing valve mechanism for a fluid pressure brake equipment having a brake pipe and an equalizing reservoir normally charged with fluid under pressure, said mechanism comprising means including a piston having a normal operating range of movement for venting fluid under pressure from the brake pipe and a different normal operating range of movement for supplying fluid under pressure to the brake pipe and having a position beyond the limits of each of said operating ranges for effecting equalization of the pressures on opposite sides of the piston, and a yielding stop member for resisting movement of said piston to its pressure equalizing position, said stop member being normally spaced away and being so positioned that it does not resist movement of said piston throughout either of its normal operating ranges.

3. An equalizing valve mechanism for a fluid pressure brake equipment having a brake pipe and an equalizing reservoir normally charged with fluid under pressure, said mechanism comprising means including a piston having a normal operating range of movement for venting fluid under pressure from the brake pipe and a different normal operating range of movement for supplying fluid under pressure to the brake pipe and having a position beyond the limits of each of said operating ranges for effecting equalization of the pressures on opposite sides of the piston, a stem carried by said piston, and a yielding stop member for engaging said stem to resist movement of said piston to its pressure equalizing position, said stop being positioned adjacent to and normally spaced away from the free end of said stem and being ineffective to resist movement of said piston throughout either of its normal operating ranges.

4. In a fluid pressure brake, the combination with a brake pipe and an equalizing reservoir normally charged with fluid under pressure, of an equalizing valve mechanism comprising a casing, a piston operatively mounted in said casing and subject to the opposing pressures of fluid in the brake pipe and that in the equalizing reservoir and having an operating stem, a discharge valve for venting fluid under pressure from the brake pipe, a supply valve for supplying fluid under pressure to the brake pipe, said piston having a normal operating range of movement for actuating said discharge valve upon a reduction in equalizing reservoir pressure and a different normal operating range of movement for actuating said supply valve upon a reduction in brake pipe pressure below that in said equalizing reservoir and having a position beyond the limits of each of said operating ranges for effecting the equalization of the pressures on opposite sides of the piston, and means positioned adjacent to and normally spaced away from the free end of said stem for resisting movement of said piston to said pressure equalizing position, said means comprising a yielding stop having a member adapted to engage the free end of said stem and a spring interposed between said member and the casing and biasing said member in the direction toward said stem.

5. An equalizing valve mechanism for a fluid pressure brake equipment of the type having a brake pipe and an equalizing reservoir normally charged with fluid under pressure, said mechanism comprising valve means subject to the opposing pressures of fluid in the brake pipe and equalizing reservoir and operative upon an increase in equalizing reservoir pressure to a certain value above brake pipe pressure, in charging and recharging the equipment, for effecting the equalization of the pressures of the brake pipe and equalization reservoir, yieldable means for resisting movement of said valve means to said equalizing position until the equalizing reservoir pressure has been increased to said certain value, said valve means being operative upon a reduction in equalizing reservoir pressure to effect a reduction in brake pipe pressure to initiate an application of the brakes and being operative upon a subsequent reduction in the reduced brake pipe pressure due to brake pipe leakage for supplying fluid under pressure to the brake pipe to compensate for said subsequent reduction in brake pipe pressure, said yieldable means being so arranged that it will not oppose the operation of the valve means to either supply fluid under pressure to or vent fluid under pressure from the brake pipe.

6. An equalizing valve mechanism for a fluid pressure brake equipment of the type having a brake pipe and an equalizing reservoir normally charged with fluid under pressure, said mechanism comprising a piston subject to the opposing pressures of fluid in the brake pipe and equalizing reservoir and operative upon an increase in equalizing reservoir pressure to a predetermined degree above brake pipe pressure, in charging and recharging the equipment, for effecting the equalization of the pressures of the brake pipe and equalizing reservoir, means comprising a resistance device normally spaced away from said piston and adapted to yieldably resist movement of said piston to said equalizing position until the equalizing reservoir pressure has been increased to said predetermined degree, said piston being operative upon a reduction in equalizing reservoir pressure to operate a valve for venting fluid from the brake pipe to initiate an application of the brakes and being operative upon a subsequent reduction in the reduced brake pipe pressure due to brake pipe leakage to operate another valve to supply fluid under pressure to the brake pipe to compensate for said subsequent reduction in brake pipe pressure, said means being so arranged that it will not oppose operation of the piston to operate either of said valves.

7. An equalizing valve mechanism for a fluid pressure brake equipment of the type having a brake pipe and an equalizing reservoir normally charged with fluid under pressure, said mechanism comprising a piston subject to the opposing pressures of fluid in the brake pipe and equalizing reservoir, a communication adapted to be established by said piston for effecting the equalization of the pressures of the brake pipe and the equalizing reservoir, said piston being operative to establish said communication upon an increase in the equalizing reservoir pressure to a certain degree exceeding the brake pipe pressure in charging and recharging the equipment, means normally spaced away from said piston and adapted to oppose movement of said piston to establish said communication until the equalizing reservoir pressure has been increased to said certain degree, valve means operative by the piston upon a reduction in equalizing reservoir pressure to effect a reduction in brake pipe pressure to initiate an application of the brakes, other valve means operative by the piston upon a subsequent reduction in the reduced brake pipe pressure due to leakage for supplying fluid under pressure to the brake pipe to compensate for said subsequent reduction in brake pipe pressure, said means being associated with said piston in such a manner as not to oppose operation of the piston to operate either of said valve means.

8. An equalizing valve mechanism for a fluid pressure brake equipment of the type having a brake pipe and an equalizing reservoir normally charged with fluid under pressure, said mechanism comprising a piston subject to the opposing pressures of fluid in the brake pipe and equalizing reservoir and operative upon an increase in equalizing reservoir pressure a predetermined degree above brake pipe pressure, in charging and recharging the equipment, for effecting the equalization of the pressures of the brake pipe and equalizing reservoir, a stem carried by said piston, means comprising yieldable means adapted to engage the outer end of said stem to oppose movement of said piston to said equalizing position until the equalizing reservoir pressure has been increased to said predetermined degree, valve means for supplying fluid under pressure to and releasing fluid under pressure from the brake pipe, said valve means being controlled by the piston and operative upon a reduction in equalizing reservoir pressure to effect a reduction in brake pipe pressure to initiate an application of the brakes and being operative upon a subsequent reduction in the reduced brake pipe pressure due to leakage for supplying fluid under pressure to the brake pipe to compensate for said subsequent reduction in brake pipe pressure, said means being arranged so as not to interfere with the operation of said valve means.

CLYDE C. FARMER.